April 19, 1932.     T. L. E. HAUG     1,854,737
BOLT FOR ASSEMBLING STRUCTURES
Filed July 23, 1930

WITNESSES:
Robert Charles Kennedy
Henry Buford Fisher

INVENTOR.
Thaddeus L. E. Haug
BY
ATTORNEY.

Patented Apr. 19, 1932

1,854,737

UNITED STATES PATENT OFFICE

THADDEUS LEON EUCLID HAUG, OF BERKELEY, CALIFORNIA

BOLT FOR ASSEMBLING STRUCTURES

Application filed July 23, 1930. Serial No. 470,138.

This invention deals primarily with the temporary fastening together of structural parts, preparatory to their permanent joining by riveting, welding, etc., and is especially applicable to ships, tanks, and other structures so built of plates that one side of the parts to be assembled is inaccessible from the other.

Such parts are usually assembled by ordinary bolts requiring two men, one of whom inserts the bolt in the hole through which the parts are to be fastened and holds the bolt head, while the other man, on the opposite side of the work, applies and tightens the nut.

The service bolt for fastening structural work, described in my U. S. Letters Patent No. 1,404,955, granted January 31, 1922, provided a means of bolting such structures, whereby only one man was needed to insert a bolt and fasten it in place, and whereby certain other advantages were gained, as described in said patent.

The last named bolt encountered certain objections, such as a tendency of the locking means to loosen under conditions of excessive vibration such as would be caused by adjacent riveting, an excessive protrusion of the locking means beyond the work when the bolt was in fastening position, and occasional difficulty in removing the bolt, should the holes bolted through move out of perfect registration after the bolt had been inserted.

The purpose of this invention is to furnish a bolt whereby the above objections are overcome, whereby the locking means is positively interlocked against loosening when the bolt is in fastening position, the protrusion of the locking means beyond the work is reduced, and bolt removal is simplified in cases where the holes bolted through have moved out of correct registration after the bolt has been inserted.

The invention possesses other advantages and features, some of which, with the foregoing, will be set forth at length in the following description, where I shall outline that form of the invention which I have selected for illustration in the drawings accompanying and forming a part of the present specification.

In said drawings I have shown one form of the construction of my invention, but it is to be understood that I do not limit myself to such form, since the invention as expressed in the claims may be embodied in a plurality of forms.

Figure 1:
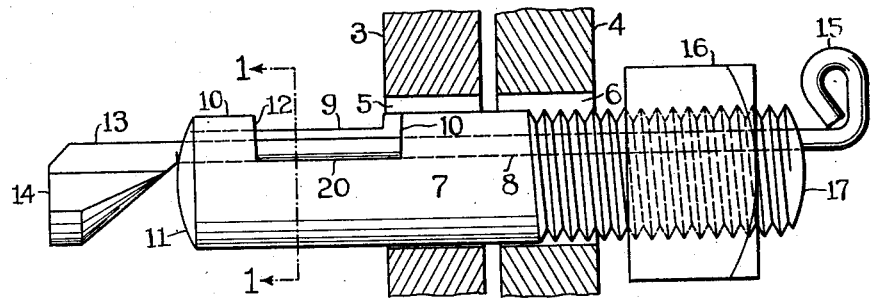
Figure 1 is a side elevation of the bolt as it appears when unlocked for insertion of the bolt through matched holes in the structural parts to be fastened, or for removal of the bolt from said holes.
Figure 2:
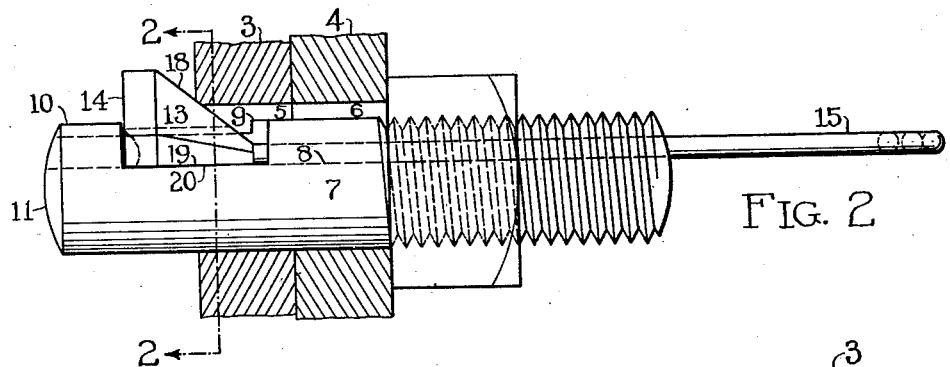
Figure 2 is a side elevation of the bolt as it appears when locked in place and fastening two structural members together.
Figure 3:
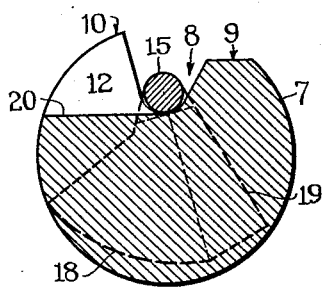
Figure 3 is an enlarged transverse cross section of Figure 1 looking toward the locking end of the bolt, and taken on line 1—1.
Figure 4:
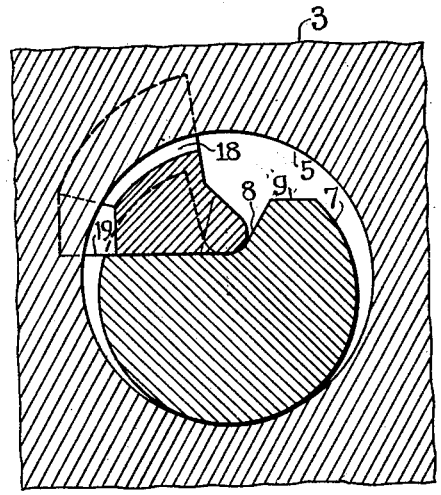
Figure 4 is an enlarged transverse cross section of Figure 2 looking toward the locking end of the bolt and taken on line 2—2.

In the drawings, 3 and 4 are structural members to be fastened together by means of bolting through holes 5 and 6 respectively.

The bolt body 7 is formed with an axial channel 8, whereof one side 9 is continuous throughout the length of the bolt, while the other side 10 is partly cut away to form a gap near head end 11 of bolt body 7, leaving the head end of channel side 10 to form an abutment 12 at the head end of the gap.

Abutment surface 12 is approximately perpendicular to the axes of bolt body 7 and channel 8, and being disposed to one side of channel 8 permits free passage of wedge 13 past abutment 12 when desired.

The head end of wedge 13 is a flat surface 14 adapted to bear against abutment 12 when the bolt is in locked position. On the other end of wedge 13 is an extension stem 15 extending past nut 16 on the screw threaded end 17 of the bolt body, whereby said wedge may be operated from the nut end of the bolt.

The wedging surface 18 of wedge 13 is the means whereby clamping pressure is transmitted to structural member 3, and side 19 of said wedge is adapted to contact with surface 20 of bolt body 7.

To insert the bolt through holes 5 and 6, wedge 13 is placed beyond the head end of bolt body 7 and in line therewith so as to clear said holes.

To lock the bolt in fastening position, wedge 13 by means of stem 15 is rotated through a half circle, pulled toward the nut, and rotated into the gap between abutment 12 and the nut end of the bolt, bringing wedge side 19 into contact with bolt body surface 20. The nut is then tightened, maintaining surfaces 19 and 20 in contact and simultaneously causing abutment 12 pushing on wedge end 14 to pull the structural members together by means of wedging surface 18. Wedge 13 is then solidly locked between abutment 12 and structural member 3, and cannot loosen until the nut is loosened, regardless of vibration.

To remove the bolt, the above process is reversed.

The positive retention of wedge 13 by abutment 12, enables the wedging surface 18 to be made much steeper with relation to the bolt axis than would otherwise be feasible, and this in turn permits the stem 15 to be correspondingly shorter and project less from the work when in fastening position.

Since abutment 12 projects from the same side of the body as channel side 9, the latter will prevent holes 5 and 6 from becoming relatively displaced a sufficient amount to seriously foul abutment 12 and thus interfere with the ready removal of the bolt in cases where holes are unfair.

In order to secure sufficient strength and hardness in the bolt, the body 7 and wedge 13 should be made of high tensile strength steel, heat treated.

I claim:

1. A bolt comprising a body with an abutment fixed transversely thereon; a nut or equivalent abutment mounted adjustably on said body; a locking member slidable along the body and adapted to engage the fixed abutment thereof; and attached to said locking member an operating means extending past said nut or adjustable abutment, whereby said locking member may be moved into or out of engagement with the fixed abutment.

2. A bolt comprising a body having an abutment fixed transversely thereon; a nut or equivalent abutment mounted adjustably on said body; a locking member slidable on said body and having a transverse locking abutment adapted to engage with said fixed abutment when the bolt is in a position fastening structural parts together, said locking abutment being movable beyond one end of the bolt body for release of said bolt from structural parts which have been assembled thereby; and means attached to said locking member whereby said locking abutment may be positioned as described.

3. A bolt comprising a body with an abutment fixed transversely thereon and a depression formed in said bolt body adjacent to said fixed abutment; a nut or equivalent abutment mounted adjustably upon the bolt body; a locking member slidable on said body and rotatable into the depression to engage the fixed abutment; and an operating member attached to said locking member whereby it may be manipulated as described from the remote side of the nut or adjustable abutment.

4. A bolt comprising a body with an abutment fixed transversely thereon, a nut or equivalent abutment mounted adjustably thereon, and an axial channel formed in said body, said channel extending between and beyond both fixed and adjustable abutments; a wedge slidable along said channel and having a locking abutment disposed transversely thereto; and an operating member extending past the nut or adjustable abutment whereby the locking abutment of the wedge may be moved into or out of engagement with the fixed abutment of the body.

In testimony whereof I have hereunto set my hand.

THADDEUS LEON EUCLID HAUG.